US011889816B1

(12) United States Patent
Miller

(10) Patent No.: US 11,889,816 B1
(45) Date of Patent: Feb. 6, 2024

(54) RELEASABLE PET LEASH

(71) Applicant: Terry L. Miller, Fort Worth, TX (US)

(72) Inventor: Terry L. Miller, Fort Worth, TX (US)

(\*) Notice: Subject to any disclaimer, the term of this patent is extended or adjusted under 35 U.S.C. 154(b) by 0 days.

(21) Appl. No.: 17/339,976

(22) Filed: Jun. 5, 2021

Related U.S. Application Data

(60) Provisional application No. 63/035,710, filed on Jun. 6, 2020.

(51) Int. Cl.
*A01K 27/00* (2006.01)

(52) U.S. Cl.
CPC .......... *A01K 27/005* (2013.01); *A01K 27/003* (2013.01)

(58) Field of Classification Search
CPC ..... A01K 27/005; A01K 27/00; A01K 27/003
See application file for complete search history.

(56) References Cited

U.S. PATENT DOCUMENTS

| | | | | |
|---|---|---|---|---|
| 3,540,089 A * | 11/1970 | Franklin | ............... | A01K 27/005 119/776 |
| 5,103,771 A * | 4/1992 | Lee | ....................... | A01K 27/005 119/776 |
| 5,450,820 A * | 9/1995 | Kirsch | .................. | A01K 27/005 119/865 |
| 6,308,662 B1 * | 10/2001 | Furman | ................. | A01K 27/005 119/776 |
| 9,284,181 B1 * | 3/2016 | Nieslanik | ............. | A01K 27/005 |
| 2006/0070584 A1 * | 4/2006 | Larouche | ............. | A01K 27/004 119/795 |
| 2006/0213455 A1 * | 9/2006 | Bien | ..................... | A01K 27/005 119/772 |
| 2008/0098965 A1 * | 5/2008 | Hachigian | ............ | A01K 27/001 119/792 |
| 2008/0245317 A1 * | 10/2008 | Caldwell | .................. | A01K 1/04 119/856 |
| 2014/0143986 A1 * | 5/2014 | Genova | ................... | F16B 7/042 24/369 |
| 2018/0374395 A1 * | 12/2018 | Johnston | .............. | A01K 27/003 |
| 2020/0236908 A1 * | 7/2020 | Lagarde | ............... | A01K 27/003 |
| 2022/0095588 A1 * | 3/2022 | Neal | ..................... | A01K 27/003 |

FOREIGN PATENT DOCUMENTS

| | | | | |
|---|---|---|---|---|
| GB | 2228660 A | * | 9/1990 | .......... A01K 1/0263 |
| WO | WO-2005089537 A1 | * | 9/2005 | .......... A01K 27/003 |

\* cited by examiner

*Primary Examiner* — Kristen C Hayes
(74) *Attorney, Agent, or Firm* — Kenneth L. Tolar

(57) ABSTRACT

A releasable pet leash includes an elongated cord or strap having a proximal end and a distal end. The proximal end includes a foam-encapsulated loop that a user grasps when walking a pet. The distal end includes a metallic bobbin removably coupled with a linkage assembly that is adapted to fasten to a pet collar. The linkage assembly includes a mechanism that automatically releases the bobbin if the leash is trapped between closed elevator doors allowing a pet to escape unharmed.

5 Claims, 6 Drawing Sheets

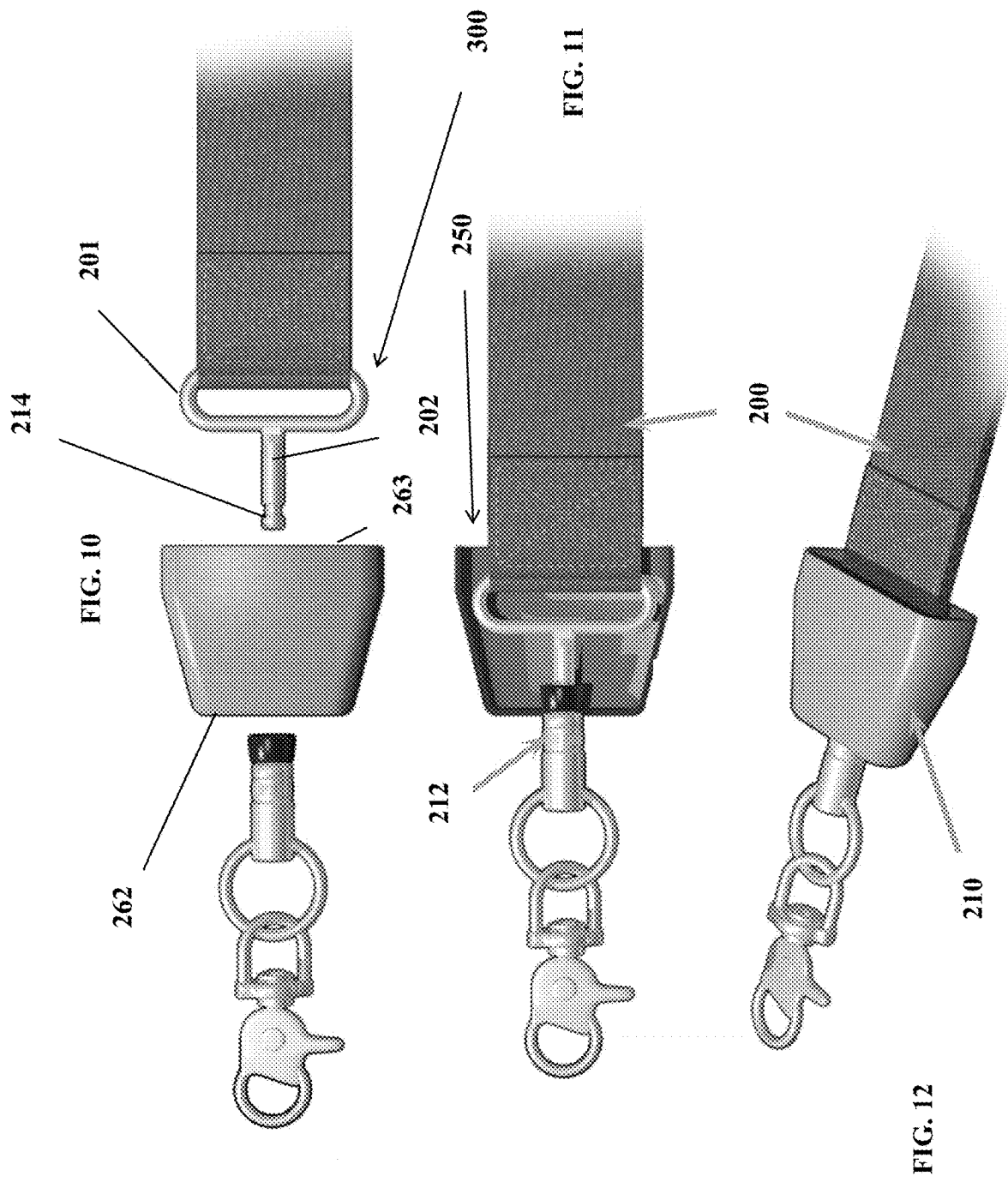

RELEASABLE PET LEASH

CROSS REFERENCE TO RELATED APPLICATIONS

This application claims priority of provisional application No. 63/035,710 filed on Jun. 6, 2020, the specification of which is incorporated herein by reference.

BACKGROUND OF THE INVENTION

The present invention relates to a pet leash that releases a tethered pet if the leash is trapped between closed elevator doors.

DESCRIPTION OF THE PRIOR ART

Many pet owners live in high-rise buildings or frequently visit dog-friendly hotels where elevators must be used to access outdoor areas. Elevator doors often quietly open and close with little warning when traveling between floors. When boarding or exiting an elevator, a distracted or inattentive owner may allow the doors to close with the pet and owner on different sides. Furthermore, a scared or anxious pet may suddenly dart into or out of an elevator as the doors are closing, trapping the pet and owner on opposite sides. If the pet cannot somehow escape the collar when the elevator begins moving, the pet can be choked to death or crushed, which can devastate a pet owner. Furthermore, if the leash is firmly secured to the owner's wrist, his or her hand could be mangled or amputated by the moving elevator.

Accordingly, there is currently a need for a leash that will automatically release a pet if the leash is trapped between closed elevator doors. The present invention addresses this need by providing a leash having a quick-release mechanism that releases a secured pet if the leash is trapped between closed elevator doors.

SUMMARY OF THE INVENTION

The present invention relates to a releasable pet leash comprising an elongated cord or strap having a proximal end and a distal end. The proximal end includes a foam-encapsulated loop that a user grasps when walking a pet. The distal end includes a metallic bobbin removably coupled with a linkage assembly that is adapted to fasten to a pet collar. The linkage assembly includes a mechanism that automatically releases the bobbin if the leash is trapped between closed elevator doors allowing a pet to escape unharmed.

It is therefore an object of the present invention to provide a pet leash that allows a tethered pet to safely enter and exit an elevator.

It is therefore another object of the present invention to provide a pet leash having a fitting that automatically releases a pet when the pet and owner are trapped on opposing sides of closed elevator doors.

It is yet another object of the present invention to provide a pet leash having a quick-release mechanism that is not affected by routine tension applied by a pet or an owner.

Other objects, features, and advantages of the present invention will become readily apparent from the following detailed description of the preferred embodiment when considered with the attached drawings and the appended claims.

BRIEF DESCRIPTION OF THE DRAWINGS

FIG. 10 is an exploded view of a slightly different embodiment of the leash according to the present invention.

FIG. 11 is a sectional view of the collar in the embodiment of FIG. 10.

FIG. 12 is a perspective view of the embodiments of FIGS. 10 and 11.

DESCRIPTION OF THE PREFERRED EMBODIMENT

Figure 1:
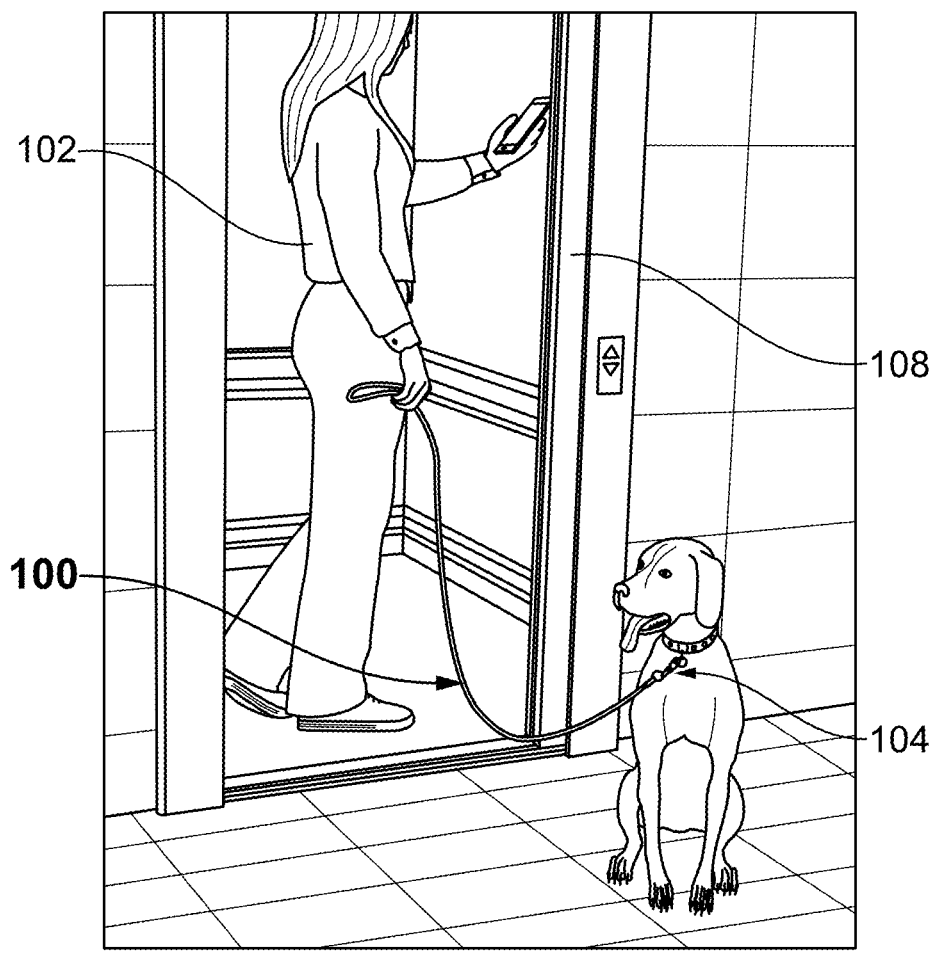
FIG. 1 is a perspective view of a user boarding an elevator with the releasable pet leash according to the present invention.
Figure 2:
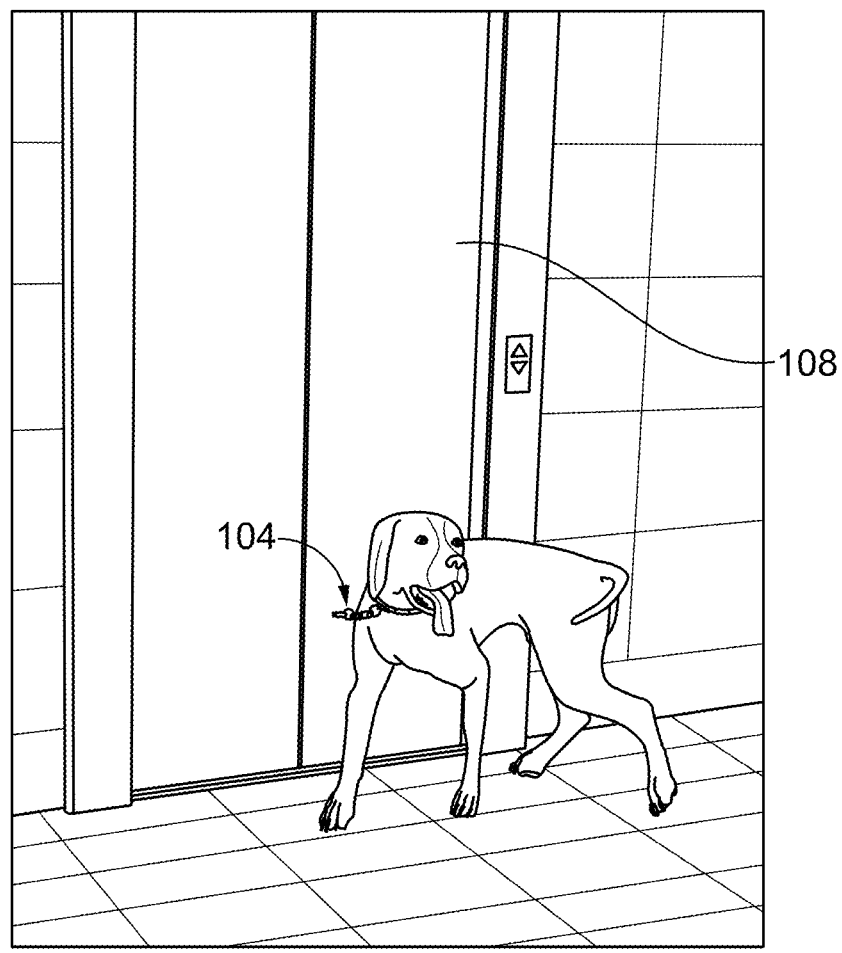
FIG. 2 is a perspective view of a dog being released from the leash according to the present invention when the elevator doors close.
Figure 3:
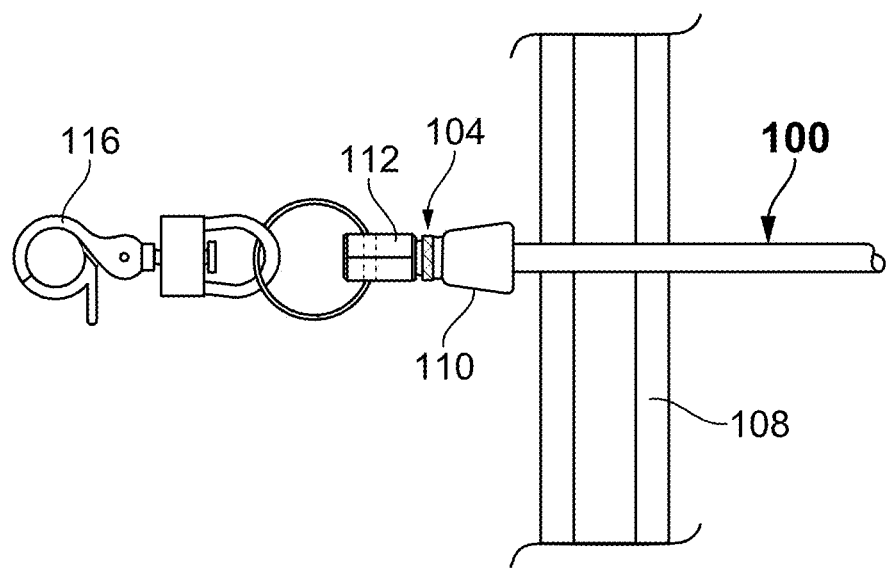
FIG. 3 is a side view of the pet leash being trapped between closing elevator doors.
Figure 4:
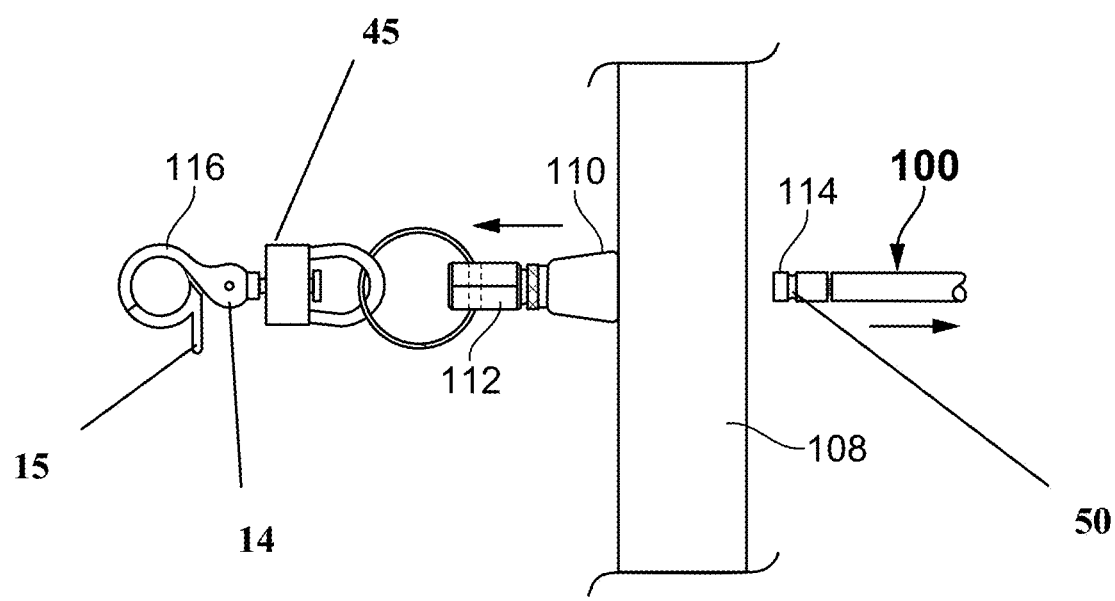
FIG. 4 is a side view of the pet leash releasing after being trapped between closing elevator doors.
Figure 5:
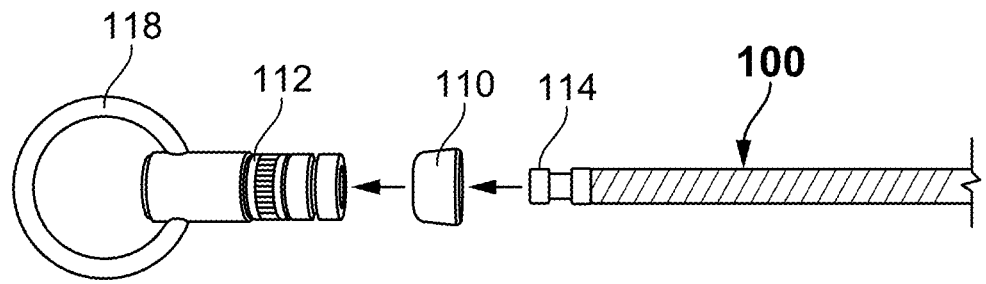
FIG. 5 is an isolated, exploded view of the quick-release mechanism.
Figure 6:
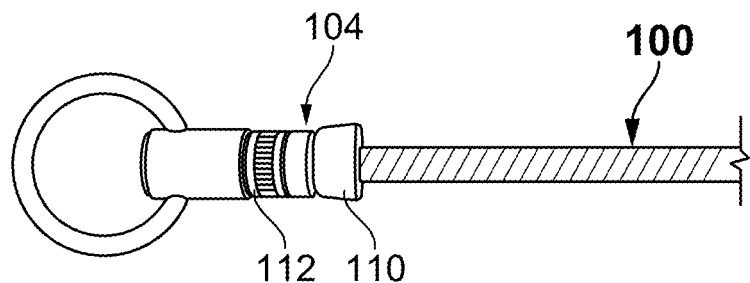
FIG. 6 is an isolated view of the quick-release mechanism with the components connected.
Figure 7:
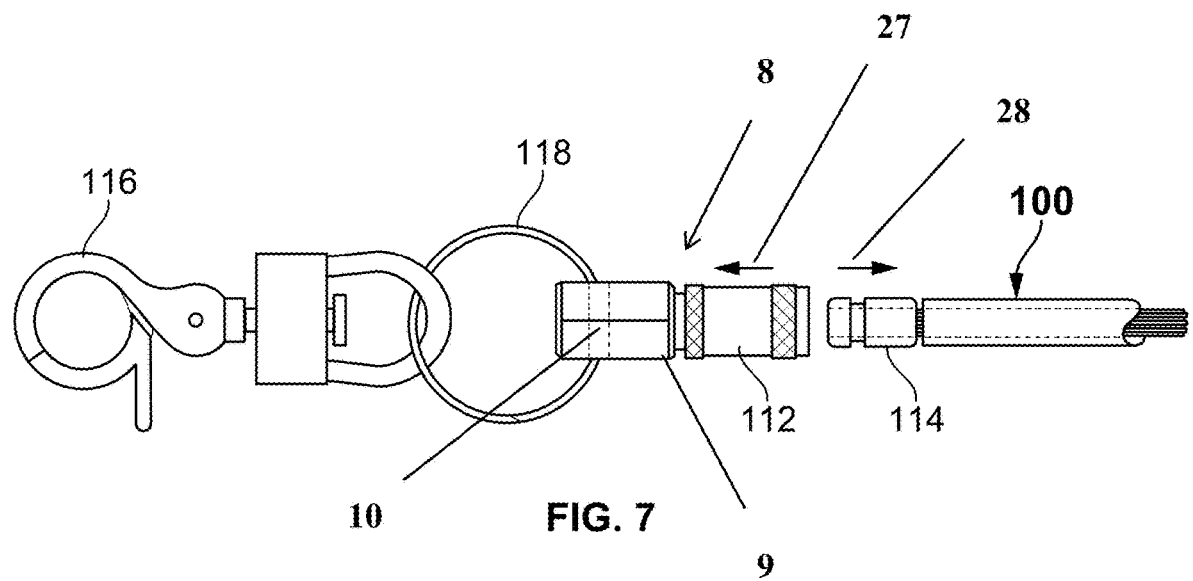
FIG. 7 depicts the quick-release mechanism immediately after releasing.
Figure 8:
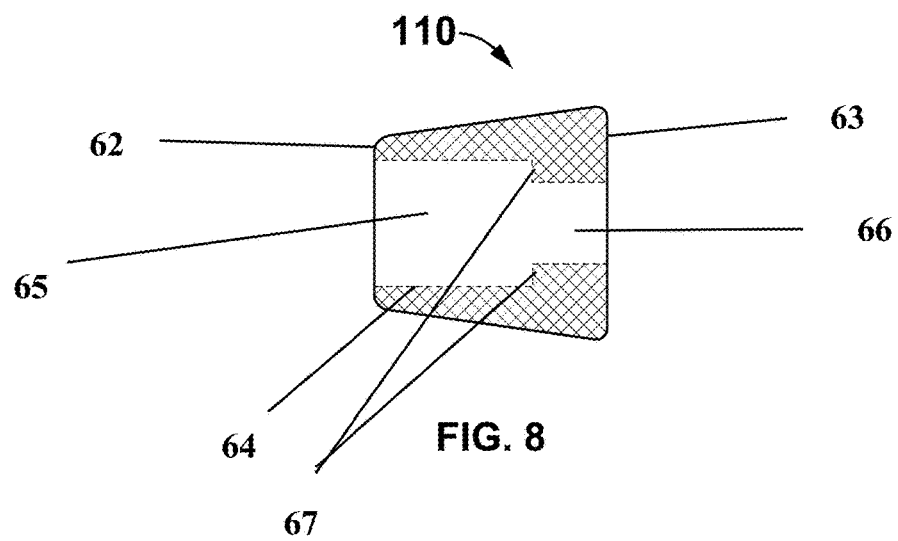
FIG. 8 is an isolated view of the collar.
Figure 9:
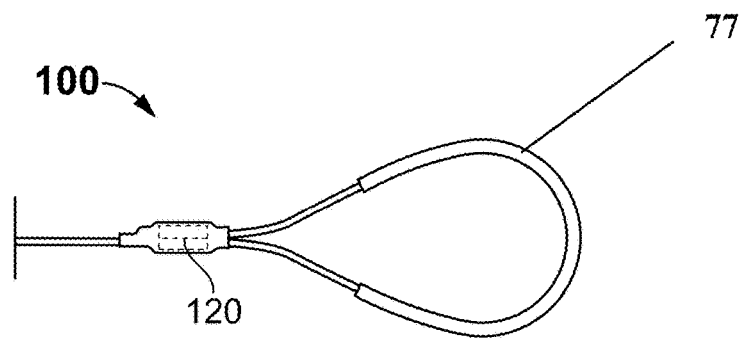
FIG. 9 is an isolated view of the handle.

Now referring specifically to FIGS. 1-9, a releasable pet leash according to a first embodiment comprises an elongated tether, such as a cord 100 or strap 200, having a proximal end and a distal end. The proximal end includes a foam-encapsulated loop 77 that a user 102 grasps when walking a pet. The loop 77 is preferably coupled with the cord using a crimp fitting 120 encapsulated by a color-matching tube to aesthetically enhance the connection. The distal end of the cord includes a metallic bobbin 114 having a peripheral groove 50 near a free end.

The leash further includes a linkage assembly identified generally as 104 including a split ring 118 with a swivel hook 45 fastened thereto. The swivel hook 45 includes a spring-biased clip 14 having a depressible lever 15 that opens and closes an eyelet 116 to releasably grip the D-ring typically found on most pet collars.

A quick-release fitting 8 includes a bushing 9 having a transverse bore 10 proximal an end that receives the split ring 118. A sleeve 112 attached to the opposing end of the fitting 8 is slidably mounted on an inner, spring-biased ball-latching mechanism. When the sleeve 112 is moved in a predetermined direction 27, the latching mechanism releases an inserted, locked component. The quick-release fitting 8 described above is often identified as a snap-type or ball-latching "quick disconnect." See for example, www.beswick.com/resources/the-basics-of-quick-disconnects.

Mounted on the exterior surface of the sleeve 112 is a frustoconical collar 110 having a smaller diameter first end 62 and a larger diameter, opposing second end 63. A passageway 64 extending from the first end 62 to the second end 63 includes a wider portion 65 for receiving the sleeve 112 and a narrower portion 66 for receiving the bobbin 114. The interface between the wider and narrower portions forms a pair of shoulders 67 that limit movement of the sleeve within the collar in a second predetermined direction 28.

To connect the linkage assembly to the cord, a user inserts the bobbin 114 into the narrower portion 66 of the sleeve until the internal locking components snap into the peripheral groove 50. If elevator doors 108 shut with a pet on one side and the owner 102 on the other, a moving elevator pulls the collar 110 against the closed doors. As additional tension is applied, the sleeve is pulled against the collar shoulders causing the internal snap or locking components to release the bobbin. The uniquely designed release mechanism will withstand routine tension applied by the pet or the owner, but will release if the collar engages an obstruction, such as closed elevator doors.

Now referring specifically to FIGS. 10-12, a slightly different embodiment of the leash is depicted wherein the tether is a flat strap 200 instead of a cord 100. The embodiment includes a connector 300 having an ovate ring 201 that is attached to the distal end of the strap 200. The ring 201 includes a post 202 extending therefrom having the notched bobbin 214 described above at a distal end. The collar 210 has a smaller diameter first end 262 and a larger diameter, opposing second end 263. A passageway (not pictured) extending from the first end 262 to the second end 263 includes a wider portion for receiving the sleeve 212 and a narrower portion for receiving the bobbin 214. The interface between the wider and narrower portions forms a pair of shoulders that limit movement of the sleeve 212 within the collar in a second predetermined direction as described above. The collar 210 is planar an includes a wide-profile opening 250 at its second end for receiving the connector 300.

The above-described device is not limited to the exact details of construction and enumeration of parts provided herein. For example, though a ball-latch type release mechanism has been primarily depicted and described, any release mechanism that functions as described herein can be used. Additionally, the leash according to the present invention can be secured to other conventional or retractable leashes as desired. Finally, the tether can be not only a cord or strap, but a chain, rope, wire, twine or any other similar element. Furthermore, the size, shape, and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A releasable pet leash comprising:
   an elongated tether having a proximal end and a distal end;
   a handle at the proximal end of said tether;
   a bobbin at the distal end of said tether, said bobbin having a peripheral groove near an end;
   a linkage assembly adapted to couple with a pet collar; said linkage assembly having a quick-release fitting that releasably grips said bobbin, said quick-release fitting including a sleeve slidably mounted on an inner, spring-biased latching mechanism that grips the groove on said bobbin whereby when said sleeve is moved in a predetermined direction, the latching mechanism releases said bobbin;
   a collar encapsulating said sleeve, said collar having a first end and an opposing second end with a passageway extending therebetween, said passageway having a wider portion that receives said sleeve and a narrower portion that receives said bobbin whereby if elevator doors shut with a pet on one side and an owner on another side, the second end of the collar engages the elevator doors and said sleeve is stopped by the narrower portion causing the internal locking components to release the bobbin.

2. The releasable pet leash according to claim 1 wherein said collar is frustoconical.

3. The releasable pet leash according to claim 1 wherein a diameter of the second end of said collar is greater than a diameter of the first end of said collar.

4. The releasable pet leash according to claim 1 wherein said linkage assembly comprises a split ring with a swivel hook fastened thereto, said swivel hook including a spring-biased clip with a depressible lever that opens and closes an eyelet to releasably grip a leash connecting ring on a pet collar.

5. The releasable pet leash according to claim 1 wherein said handle is a foam-encapsulated loop.

* * * * *